US012738135B2

(12) United States Patent
Maeda et al.

(10) Patent No.: US 12,738,135 B2
(45) Date of Patent: Sep. 15, 2026

(54) TRACKING SYSTEM

(71) Applicants: Junpei Maeda, Kanagawa (JP); Yoshiharu Takahashi, Tokyo (JP); Ryoh Watanabe, Kanagawa (JP)

(72) Inventors: Junpei Maeda, Kanagawa (JP); Yoshiharu Takahashi, Tokyo (JP); Ryoh Watanabe, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 266 days.

(21) Appl. No.: 18/611,732

(22) Filed: Mar. 21, 2024

(65) Prior Publication Data

US 2024/0321072 A1 Sep. 26, 2024

(30) Foreign Application Priority Data

Mar. 23, 2023 (JP) ................................ 2023-047240
Feb. 22, 2024 (JP) ................................ 2024-025707

(51) Int. Cl.
*G08B 13/24* (2006.01)

(52) U.S. Cl.
CPC ................................ *G08B 13/2457* (2013.01)

(58) Field of Classification Search
CPC .................................................. G08B 13/2457
USPC ....................................................... 340/572.1
See application file for complete search history.

(56) References Cited

U.S. PATENT DOCUMENTS 8,089,341 B2 * 1/2012 Nakagawa ............... G07C 9/27 340/5.23
9,521,293 B2 * 12/2016 Kurokawa ......... H04N 1/32539
2010/0073134 A1 * 3/2010 Chikada ................... G07C 9/20 340/5.86
2015/0077797 A1 3/2015 Kurokawa
2017/0316493 A1 * 11/2017 Numata ............. G06Q 30/0631
2023/0092733 A1 * 3/2023 Ravinathan ........ G06Q 20/3827 705/75

FOREIGN PATENT DOCUMENTS

CN 203552320 U * 4/2014
CN 104809779 A * 7/2015
CN 114898511 A * 8/2022 ............. G07G 1/009
JP 2001-229263 A 8/2001
JP 2005-284944 A 10/2005
JP 2006-182551 A 7/2006
JP 2015-060318 A 3/2015

* cited by examiner

*Primary Examiner* — Kam Wan Ma
(74) *Attorney, Agent, or Firm* — XSENSUS LLP

(57) ABSTRACT

A tracking system includes a gate including an information reader and gate circuitry. The gate is at least two gates including one gate placed at an entrance of a management area and the other gate placed at an entrance of an area. The management area is a place to keep an item to be lent. The area is included in another place to which the item is taken after being lent. The tracking system includes a server and an item management apparatus. The gate circuitry requests accumulating, in the item management apparatus via the server, item identification information identifying the item and read from an information holding medium related to the item, user identification information identifying a user and read from another information holding medium related to the user, and gate identification information identifying the gate.

20 Claims, 15 Drawing Sheets

FIG. 3

| DATE AND TIME | GATE NAME | ENTRY/EXIT | USER NAME | ITEM NAME | LENDING DATE AND TIME | RETURN DEADLINE | RETURN DATE AND TIME |
|---|---|---|---|---|---|---|---|
| 12/2 10:00 | MANAGEMENT AREA | EXIT | D | ITEM E | 12/2 10:00 | 12/9 10:00 | – |
| 12/2 10:10 | AREA C | ENTRY | D | ITEM E | 12/2 10:00 | 12/9 10:00 | – |
| 12/8 17:00 | AREA C | EXIT | D | ITEM E | 12/2 10:00 | 12/9 10:00 | – |
| 12/8 17:10 | MANAGEMENT AREA | ENTRY | D | ITEM E | 12/2 10:00 | 12/9 10:00 | 12/8 17:00 |

FIG. 6A

| ITEM ID | MANAGEMENT AREA X | MANAGEMENT AREA Y |
|---|---|---|
| A | 1 | 0 |
| B | 1 | 0 |
| C | 1 | 1 |
| D | 0 | 1 |
| E | 0 | 1 |
| F | 1 | 1 |

FIG. 6B

| ITEM ID | MANAGEMENT AREA |
|---|---|
| A | X |
| B | X |
| C | X,Y |
| D | Y |
| E | Y |
| F | X,Y |

| ITEM ID \ AREA ID | A | B | C | D | E | F | G |
|---|---|---|---|---|---|---|---|
| A | 0 | 0 | 1 | 0 | 0 | 0 | 0 |
| B | 1 | 1 | 1 | 1 | 1 | 1 | 1 |
| C | 1 | 1 | 0 | 0 | 0 | 0 | 0 |

| ITEM ID | PERMISSION AREA |
|---|---|
| A | C |
| B | ALL |
| C | A,B |

FIG. 10

| | DATE AND TIME | GATE NAME | ENTRY/ EXIT | USER NAME | ITEM NAME | LENDING DATE AND TIME | RETURN DEADLINE | RETURN DATE AND TIME |
|---|---|---|---|---|---|---|---|---|
| | 1/10 13:05 | MANAGE-MENT AREA | EXIT | C | ITEM B | 1/10 13:00 | 1/15 13:00 | – |
| 4-1 | 1/10 13:10 | AREA A | ENTRY | C | ITEM B | 1/10 13:00 | 1/15 13:00 | – |
| 4-2 | 1/12 15:00 | AREA A1 | ENTRY | C | ITEM B | 1/10 13:00 | 1/15 13:00 | – |
| | 1/14 10:00 | AREA A1 | EXIT | C | ITEM B | 1/10 13:00 | 1/15 13:00 | – |
| 4-3 | 1/14 10:01 | AREA A3 | ENTRY | C | ITEM B | 1/10 13:00 | 1/15 13:00 | – |

FIG. 12A

5

S301: DISPLAY ON DISPLAY 5 MANAGEMENT INFORMATION OF ITEM B AND ITEM D

| DATE AND TIME | GATE NAME | ENTRY/EXIT | USER NAME | ITEM NAME | LENDING DATE AND TIME | RETURN DEADLINE | RETURN DATE AND TIME |
|---|---|---|---|---|---|---|---|
| 1/10 13:05 | MANAGE-MENT AREA | EXIT | C | ITEM B | 1/10 13:00 | 1/15 13:00 | – |
| 1/10 13:10 | AREA A | ENTRY | C | ITEM B | 1/10 13:00 | 1/15 13:00 | – |

S302: RECEIVE SELECTION OF MANAGEMENT INFORMATION FROM USER

| DATE AND TIME | GATE NAME | ENTRY/EXIT | USER NAME | ITEM NAME | LENDING DATE AND TIME | SPECIFIED RETURN DATE AND TIME | RETURN DATE AND TIME |
|---|---|---|---|---|---|---|---|
| 1/11 10:05 | MANAGE-MENT AREA | EXIT | A | ITEM D | 1/11 10:00 | 1/16 10:00 | – |
| 1/11 10:10 | AREA C | ENTRY | A | ITEM D | 1/11 10:00 | 1/16 10:00 | – |

FIG. 12B

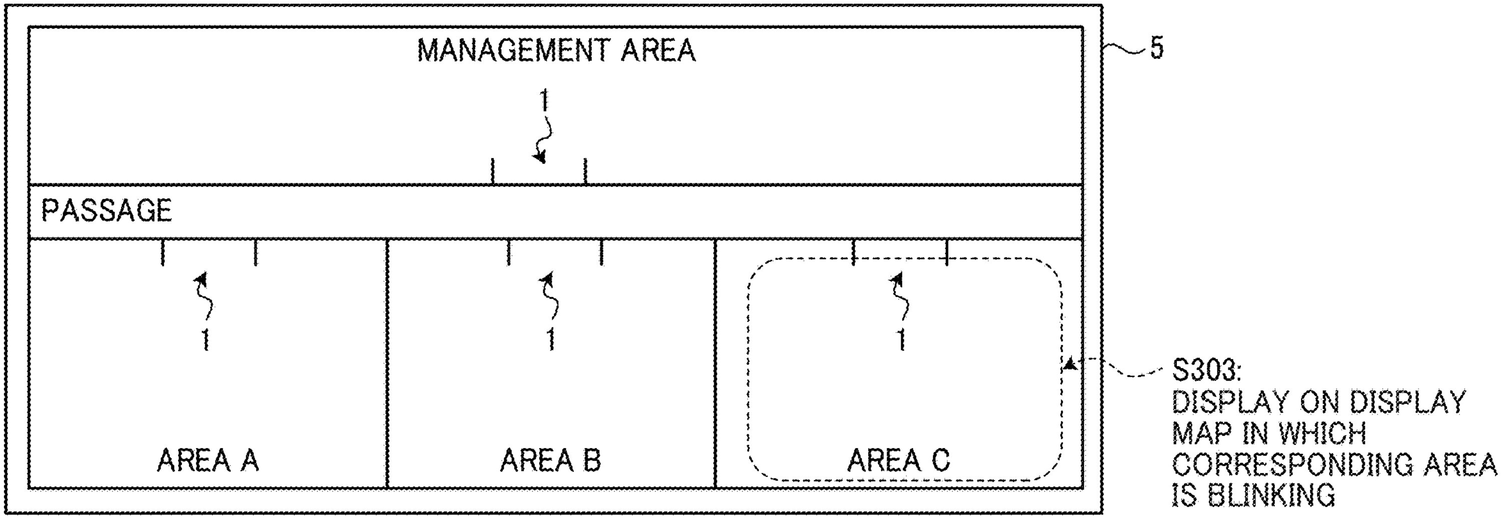

FIG. 14

| | DATE AND TIME | GATE NAME | ENTRY/EXIT | USER NAME | ITEM NAME | LENDING DATE AND TIME | RETURN DEADLINE | RETURN DATE AND TIME | RESERVATION STATUS |
|---|---|---|---|---|---|---|---|---|---|
| | 1/10 13:05 | MANAGEMENT AREA | EXIT | C | ITEM B | 1/10 13:00 | 1/15 13:00 | – | |
| | 1/10 13:10 | AREA A | ENTRY | C | ITEM B | 1/10 13:00 | 1/15 13:00 | – | |
| 6-1 | 1/12 15:00 | – | – | D | ITEM B | – | – | – | UNDER REQUEST |
| | 1/12 15:10 | AREA A | EXIT | C | ITEM B | 1/10 13:00 | 1/15 13:00 | – | |
| 6-2 | 1/12 15:11 | MANAGEMENT AREA | ENTRY | C | ITEM B | 1/10 13:00 | 1/15 13:00 | 1/12 15:15 | |
| 6-3 | 1/12 15:15 | MANAGEMENT AREA | – | D | ITEM B | – | – | – | RESERVED |

TRACKING SYSTEM

CROSS-REFERENCE TO RELATED APPLICATIONS

This patent application is based on and claims priority pursuant to 35 U.S.C. § 119(a) to Japanese Patent Application Nos. 2023-047240, filed on Mar. 23, 2023, and 2024-025707, filed on Feb. 22, 2024, in the Japan Patent Office, the entire disclosure of each is hereby incorporated by reference herein.

BACKGROUND

Technical Field

Embodiments of the present disclosure relate to a tracking system.

Related Art

In order to easily know a storage place of a document stored at random, in a proposed technology, a non-contact integrated circuit (IC) chip is mounted on the document itself, a storage shelf in which a reader for reading the document is mounted is prepared, and information read by the reader is stored in a server. By so doing, document position information is provided at the time of search for the document.

SUMMARY

According to one or more embodiments, a tracking system includes a gate including an information reader and gate circuitry. The gate is at least two gates including one gate placed at an entrance of a management area and the other gate placed at an entrance of an area. The management area is a place to keep an item to be lent. The area is included in another place to which the item is taken after being lent. The tracking system includes a server and an item management apparatus. The gate circuitry requests accumulating, in the item management apparatus via the server, item identification information identifying the item and read from an information holding medium related to the item, user identification information identifying a user and read from another information holding medium related to the user, and gate identification information identifying the gate.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 3 is a diagram illustrating management information of the tracking system according to the first embodiment of the present disclosure;

FIGS. 6A and 6B are diagrams each illustrating an example of management area information indicating a storage place for each item, according to some embodiments of the present disclosure;

FIG. 10 is a diagram illustrating an example of an image of management information of the tracking system according to a fourth embodiment of the present disclosure;

FIGS. 12A and 12B are diagrams each illustrating an example of usage of a tracking system according to the fifth embodiment of the present disclosure;

FIG. 14 is a diagram illustrating an example of management information of a tracking system according to the sixth embodiment of the present disclosure.

Figure 1A:
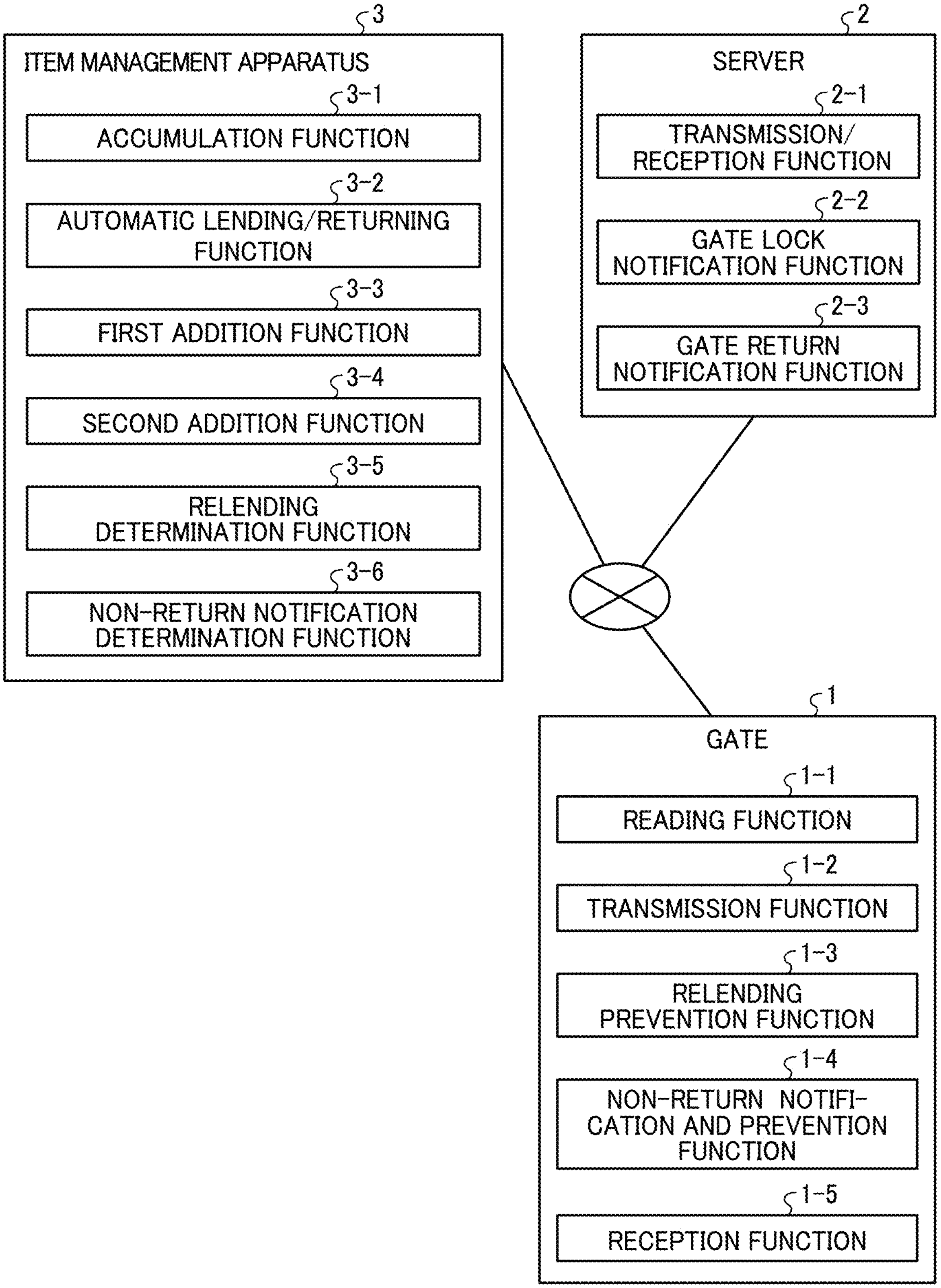
FIG. 1A is a block diagram illustrating a configuration of a tracking system according to a first embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Some embodiments of a tracking system are described below in detail with reference to the accompanying drawings.

First Embodiment

FIG. 1A is a block diagram illustrating a configuration of a tracking system according to a first embodiment of the present disclosure. The tracking system according to the present embodiment can manage lending of an item stored or kept in a management area and track a place to which an item is taken or brought after being lent to a user. Specifically, as illustrated in FIG. 1A, the tracking system includes a server 2, a gate 1, and an item management apparatus 3.

The gate 1 is placed at an entrance (entrance/exit) of each of the management area and an area included in a place to which an item is taken or brought after being lent to a user. The number of areas may be more than one. In the present embodiment, the entrance includes an exit, namely the entrance also serves as an exit. In other words, the gate 1 is placed in relation to the management area and each of multiple areas. In the present embodiment, the management area is an area in which items are stored or kept. Further, in the present embodiment, the management area is an area in which lending an item to the outside the management area and returning an item to the inside of the management area are managed. Further, the gate 1 includes an information reader (see FIG. 1C) that can read information from an information holding medium, such as a radio frequency identification (RFID) tag, and detects position information of a lent item.

The information holding medium is not limited to an RFID tag. Examples of the information holding medium includes a magnetic card, an integrated circuit (IC) card, and a card on which a QUICK RESPONSE (QR) CODE is printed. Further, the information reader is not limited to a RFID reader, and may be, for example, a reading device that reads information from a magnetic card or an IC card, or a QR CODE (registered trademark) reader.

The gate 1 can lock a door to prevent lent items from being relent or forgotten to be returned. In the present embodiment, relending an item means that an item lent to a person is lent to another person before returning the item. Further, the gate 1 accumulates or stores, in the item management apparatus 3 via the server 2, item identification information identifying an item and user identification information identifying a user read from an information holding medium of the item and an information holding medium of the user, respectively, and accumulates or stores gate identification information identifying the gate 1. This allows an available user of the item to specify the position information of the item by browsing the accumulated information using the item management apparatus 3. Further, even if an item is not always placed in a range detectable by an information reader 517 of the gate 1, the position information of the item can be specified based on the item identification information, the user identification information, and the gate identification information accumulated in the item management apparatus 3.

Conventionally, to search for a lost item takes time because a place where the item is taken or brought after being lent to a user is unknown. To cope with this, according to the present embodiment, the user identification information, the item identification information, and the gate identification information accumulated in the item management apparatus 3 can be viewed, and the position information of the item can be grasped, accordingly. In other words, in the present embodiment, the gate 1 provided with the information reader 517 is placed at the entrance (entrance/exit) of the area, the information holding medium attached to an item is read when the item passes through the gate 1, and position information of the item is accumulated in the item management apparatus 3. This allows the position information of the item to be tracked. As a result, loss of a lent item due to, for example, the relending of the item to a different user other than the user to whom the item has been lent or the failure to return the lent item can be prevented.

The gate 1 includes a reading function 1-1 for reading user identification information and item identification information from an information holding medium of a user and an information holding medium of an item, respectively, by using the information reader 517. The reading function 1-1 detects presence of an information holding medium held by a user (for example, incorporated in an employee ID card) and an information holding medium attached to an item (for example, incorporated in a tag), which have approached the gate 1, reads user identification information from the information holding medium of the user, and reads item identification information from the information holding medium of the item.

In a case that the information holding medium is a type to be touched or swiped to be read by the information reader 517, the user touches or swipes, for example, the employee ID card or the tag.

The gate 1 includes a transmission function 1-2 for transmitting, to the server 2, the user identification information and the item identification information read from the information holding medium of the user and the information holding medium of the item, respectively, in addition to the gate identification information identifying the gate 1. Specifically, the transmission function 1-2 transmits the identification information of the information holding medium of the user and the identification information of the information holding medium of the item, which are acquired by the reading function 1-1, and the identification information assigned to the gate 1 of each area to the server 2. Accordingly, the position information of the item can be recorded.

The gate 1 includes a relending prevention function 1-3 for preventing an item lent to a user from being relent to another user, namely preventing the relending of the item to a different user other than the user currently borrowing the item before returning the item.

The relending prevention function 1-3 locks the door of the gate 1 when identification information identifying a different user other than the user to whom the item has been lent is read. In other words, the relending prevention function 1-3 locks the door of the gate 1 when the user identification information read by the reading function 1-1 is different user identification information identifying the different user other than the user to whom the item has been lent. This prevents the different user from passing through the gate 1. There is a case where an item may be lost due to relending the item to a user other than the user of the item (the user to whom the item has been lent). To cope with this, in the present embodiment, the relending prevention function 1-3 locks the door of the gate 1 of an area to prevent the user other than the user of the item from passing through the gate 1 when he or she is to take out the item from the area. The automatic lending of an item to a user is performed by an automatic lending/returning function 3-2 of the item management apparatus 3. Regarding locking of the door of the gate 1 at the time of relending of an item, a relending determination function 3-5 of the item management apparatus 3 determines for the locking and instructs to the gate 1 to lock the door.

The gate 1 includes a non-return notification and prevention function 1-4 for preventing a user from forgetting to return an item he or her has borrowed. The non-return notification and prevention function 1-4 notifies the user of non-return of the item, or makes a reminder for the user to return the item, by a return notification unit (for example, buzzer, monitor) and prompts or reminds the user to return the item when the user passes through the gate 1 with the lent item at a date and time close to a return deadline determined by the item management apparatus 3. For example, the date and time close to a return deadline can be set by an administrator or designer of the tracking system. For example, the date and time close to a return deadline can be set one day before the return deadline.

Further, when the user is about to leave or exit the area in which the user has used the item without the item on the day of the return date and time, the non-return notification and prevention function 1-4 notifies the return notification unit of a non-return notification instruction for notifying that the item has been forgotten to be returned, in order to lock the door of the gate 1. Conventionally, there are cases where an additional user who is waiting to use an item next (in the following description, referred to as a next user) fails to use the item immediately or smoothly because the item is forgotten to be returned. To cope with this, in the present embodiment, the non-return notification and prevention function 1-4 provides the gate 1 with the non-return notification instruction when a return deadline (return date and time) of the item is approaching, and locks the door when the user without the item is to exit the area on the day of the return deadline. The non-return notification and prevention function 1-4 allows the user to pass through the gate 1 without locking the door when the user leaves or exits the area together with the item to be returned. The notification of non-return notification instruction to the return notification unit and the locking of the door are determined by a non-return notification determination function 3-6 of the item management apparatus 3, and the instruction is issued by the non-return notification determination function 3-6 of the item management apparatus 3.

The gate 1 includes a reception function 1-5 for receiving a gate lock instruction and the non-return notification instruction notified from the server 2 (a gate lock notification function 2-2 and a gate return notification function 2-3, which are described later). The relending prevention function 1-3 locks the door of the gate 1 in response to the gate lock instruction received by the reception function 1-5. Further, the non-return notification and prevention function 1-4 locks the door of the gate 1 in response to the non-return notification instruction received by the reception function 1-5.

The server 2 mediates between the gate 1 and the item management apparatus 3. The server 2 includes a transmission/reception function 2-1 for receiving identification information (identification information of each of the user, the item, and the gate 1) from the gate 1. The server 2 includes the gate lock notification function 2-2 for receiving, from the item management apparatus 3, the gate lock instruction in relation to the gate 1 and the non-return notification instruction.

The transmission/reception function 2-1 is a function for receiving identification information of each of the user, the item, and the gate 1 from the gate 1 and transmitting the identification information of each of the user, the item, and the gate 1 to the item management apparatus 3.

The gate lock notification function 2-2 is a function for notifying the gate 1 of the gate lock instruction for locking the door so as not to allow the item to pass through the gate 1, which is transmitted from the item management apparatus 3, when the item is determined to be relending.

When the non-return notification determination function 3-6 of the item management apparatus 3 determines that the item has been forgotten to be returned, the gate return notification function 2-3 notifies the return notification unit of the non-return notification instruction transmitted from the item management apparatus 3.

The item management apparatus 3 can identify a place where an item is used. The item management apparatus 3 receives identification information acquired each time a user and an item pass through the gate 1 from the server 2, and records or stores the identification information as position information of the item. Further, the item management apparatus 3 allows a user who can borrow items stored or kept in the management area to view information on the items. Accordingly, the position information of an item can be grasped from the management information (for example, information items of user name, item name, entry/exit status, lending date and time, and return deadline) accumulated or stored when the item passes through the gate 1, and the item can be prevented from being lost. The lending and returning of an item are also automatically performed by using the gate 1.

The item management apparatus 3 includes an accumulation function 3-1. The accumulation function 3-1 is a function for accumulating or storing identification information of each of the user, the item, and the gate 1. Specifically, the accumulation function 3-1 accumulates or stores the identification information of the user and the item read at the gate 1 as the management information.

The item management apparatus 3 includes the automatic lending/returning function 3-2 for automatically performing lending processing for lending an item and returning processing for returning an item. The automatic lending/returning function 3-2 lends an item by associating the user identification information and the item identification information accumulated by the accumulation function 3-1 when the user exits the management area with the item in the management area. At this time, the automatic lending/returning function 3-2 also adds a lending date and time of the item and a return deadline of the item to the management information, and the lending date and time of the item and the return deadline of the item are recorded or stored. In the present embodiment, the lending date and time is a date and time when the item passed through the gate 1. The return deadline is a date and time obtained by adding a lendable period that is set to the item to the lending date and time.

Further, the automatic lending/returning function 3-2 completes returning processing for returning the item when the user and the item that have been associated with each other at the time of lending processing enter the management area for returning the item. At this time, the automatic lending/returning function 3-2 adds automatic lending/returning function a return date and time (for example, when the item and the user pass through the gate 1) to the management information, and the return date and time is recorded or stored.

The item management apparatus 3 includes a first addition function 3-3 for adding a user name and an item name to the management information including the user identification information and the item identification information. The first addition function 3-3 includes a table that is a list including a user name corresponding to the user identification information and an item name corresponding to the item identification information in the item management apparatus 3. When the first addition function 3-3 receives the user identification information and the item identification information from the server 2, the first addition function 3-3 searches for a user name and an item name corresponding to the user identification information and the item identification information, respectively, using the list, and adds the user name and the item name to the management information including the user identification information and the item identification information.

The item management apparatus 3 includes a second addition function 3-4 for determining with respect to entry/exit to/from the area and adding the determination result to management information. The second addition function 3-4 determines whether the user has entered or exited the area based on the entry/exit status at the time of the previous passage through the gate 1. The entry/exit status is to be "exit" if the last status is "entry," and the entry/exit status is to be "entry" if the last status is "exit". The entry/exit status is added to management information including the user identification information, the item identification information, the user name, and the item name. In a case where there is no management information for an item, this means that the item is to pass through the gate 1 for the first time. In such a case, since the item is in the management area before being lent, the status of the item passing through the gate 1 for the first time is to be "exit".

The item management apparatus 3 includes the relending determination function 3-5 for determining whether an item is subject to relending for a user other than the user to whom the item has been lent. A relending determination function 3-5 determines whether the user identification information is associated with the item identification information by the automatic lending/returning function 3-2 based on the user identification information and the item identification information, each time the user passes through the gate 1, and determines whether the item is subjected to relending for a user other than the user to whom the item has been lent. In other words, the relending determination function 3-5 determines whether the user identification information is the same as the user identification information recorded at the time of the lending processing performed by the automatic lending/returning function 3-2 based on the user identification information and the item identification information each time the user passes through the gate 1. When different user identification information that is different from the user identification of the user to whom the item has been lent is transmitted, a relending determination function 3-5 determines that the item is subjected to relending for a different user, and transmits the gate lock instruction for locking the gate to the server 2 to prevent the item from being taken out from the area.

The item management apparatus 3 includes the non-return notification determination function 3-6 for determining for the non-return notification to a user, that is, a reminder for returning the item to the user. The non-return notification determination function 3-6 determines with respect to non-return of the item each time the user passes through the gate 1, and determines that the item is forgotten to be returned in a case that difference between the return deadline determined by the automatic lending/returning function 3-2 and the current date and time is less than a predetermined days, and transmits to the server 2 the non-return notification instruction. Further, the non-return notification determination function 3-6 keeps the door from opening and prevents the user from exiting the area when the gate 1 has not detected the information holding medium of the item to be returned simultaneously with the information holding medium of the user when the user exits the area where the item was used on the day of the return deadline. By so doing, the item can be surely returned within the due date and can be immediately used by the next user.

Figure 1B:
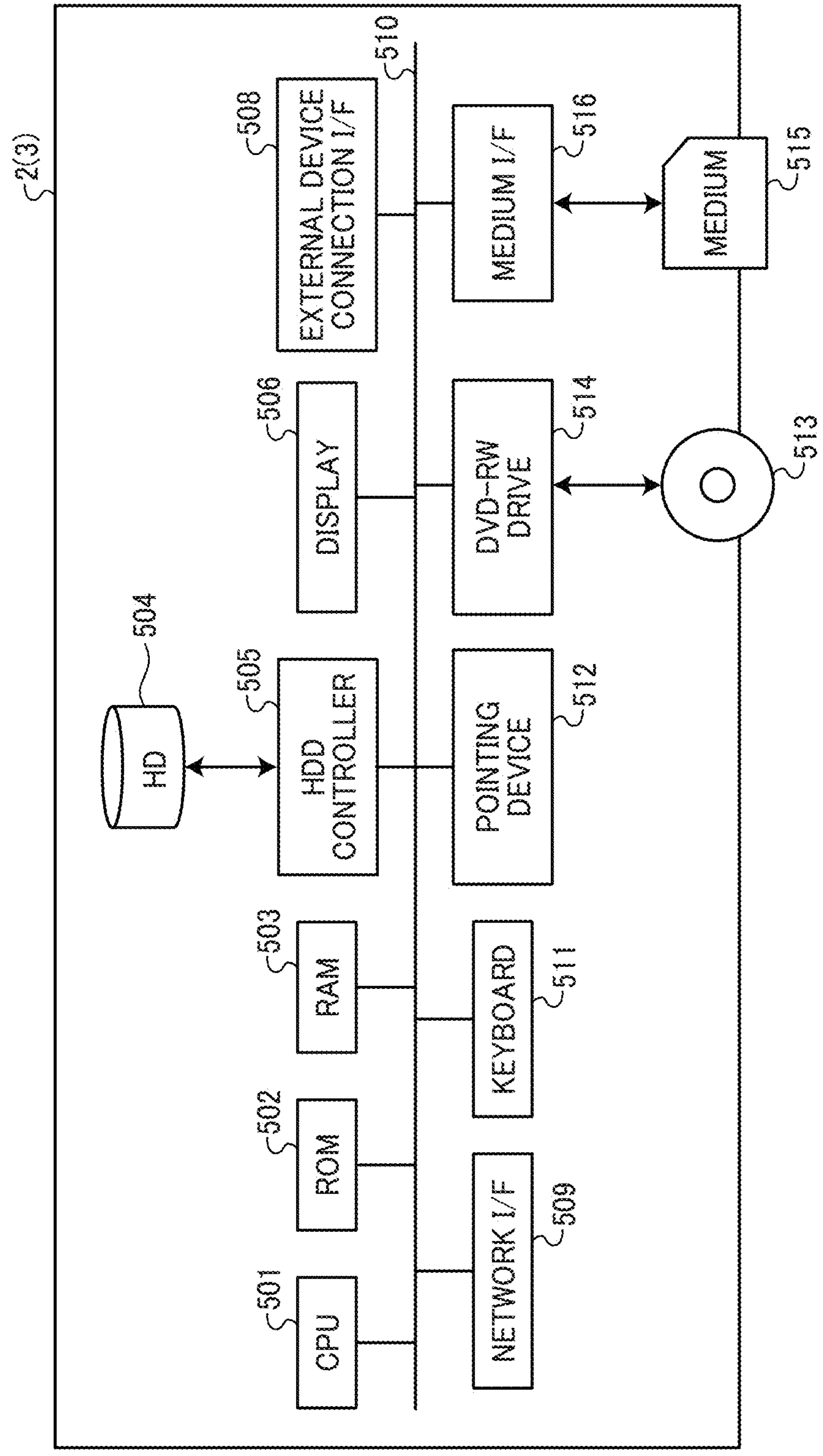
FIG. 1B is a block diagram illustrating a hardware configuration of each of a server and an item management apparatus included in the tracking system according to the first embodiment of the present disclosure.

FIG. 1B is a block diagram illustrating a hardware configuration of a server or an item management apparatus according to the present embodiment. In the following description, the hardware configuration of the server 2 is described, but the item management apparatus 3 also has the same hardware configuration.

As illustrated in FIG. 1B, the server 2 is implemented by a computer, and includes a central processing unit (CPU) 501, a read-only memory (ROM) 502, a random access memory (RAM) 503, a hard disk (HD) 504, a hard disk drive (HDD) controller 505, a display 506, an external device connection interface (I/F) 508, a network I/F 509, a data bus 510, a keyboard 511, a pointing device 512, a digital versatile disk rewritable (DVD-RW) drive 514, and a medium I/F 516.

The CPU 501 controls entire operation of the server 2. The ROM 502 stores programs used for driving the CPU 501, such as the initial program load (IPL). The RAM 503 is used as a working area for the CPU 501. The HD 504 stores various data such as a program. The HDD controller 505 controls the reading or writing of various data to or from the HD 504 under the control of the CPU 501. The display 506 displays various information such as a cursor, a menu, a window, characters, or an image. The external device connection I/F 508 is an interface that connects to various external apparatuses (devices). Examples of the external devices include, but are not limited to, a universal serial bus (USB) memory and a printer. The network I/F 509 is an interface that controls communication of data through a communication network. The data bus 510 is, for example, an address bus or a data bus that electrically connect components, such as the CPU 501, illustrated in FIG. 1B.

The keyboard 511 serves as an input device and includes multiple keys for inputting, for example, characters, numerical values, and various instructions. The pointing device 512 serves as an input device that allows a user to, for example, select or execute a specific instruction, select a target for processing, and move a cursor being displayed. The DVD-RW drive 514 controls the reading or writing of various types of data to or from a DVD-RW 513, which is an example of a removable recording medium. The recording medium is not limited to the DVD-RW, and may be, for example, a DVD-R. The medium I/F 516 controls the reading or writing (storing) of data from or to a storage medium (recording medium) 515 such as a flash memory.

The CPU 501 of the server 2 executes various programs stored in the ROM 502 to implement various functions such as the transmission/reception function 2-1, the gate lock notification function 2-2, and the gate return notification function 2-3.

The CPU 501 of the item management apparatus 3 executes various programs stored in the ROM 502 to implement the accumulation function 3-1, the automatic lending/returning function 3-2, the first addition function 3-3, the second addition function 3-4, the relending determination function 3-5, and the non-return notification determination function 3-6.

Figure 1C:
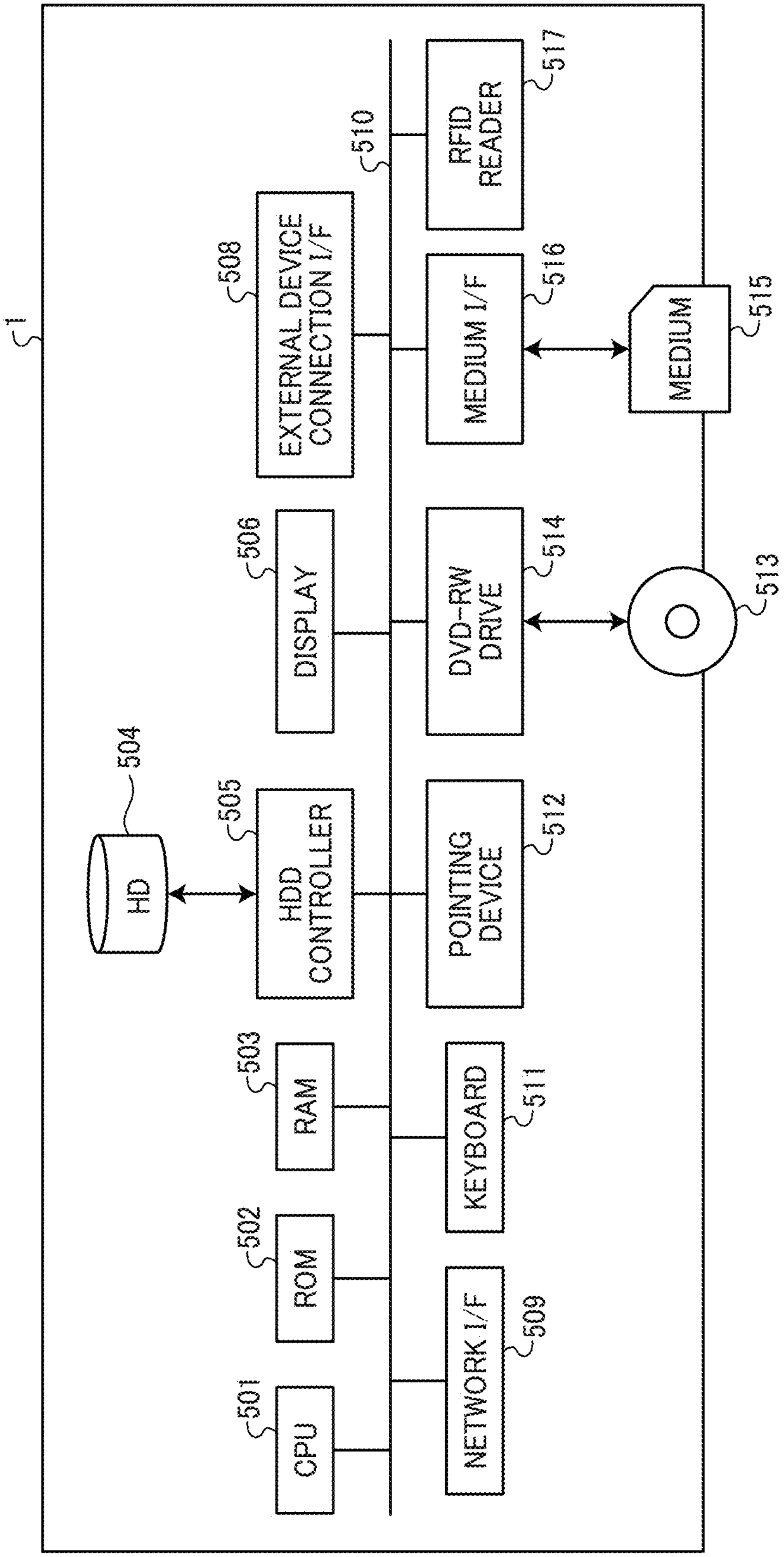
FIG. 1C is a block diagram illustrating a hardware configuration of a gate included in the tracing system according to the first embodiment of the present disclosure.

FIG. 1C is a block diagram illustrating a hardware configuration of a gate included in a tracing system according to the present embodiment. As illustrated in FIG. 1C, the gate 1 includes the information reader 517 in addition to the same hardware configuration as the server 2. The information reader 517 reads information of the information holding medium.

The CPU 501 of the gate 1 controls each part of the gate 1, and implements the reading function 1-1, the transmission function 1-2, the relending prevention function 1-3, the non-return notification and prevention function 1-4, and the reception function 1-5 by executing various programs stored in the ROM 502.

Figure 2:
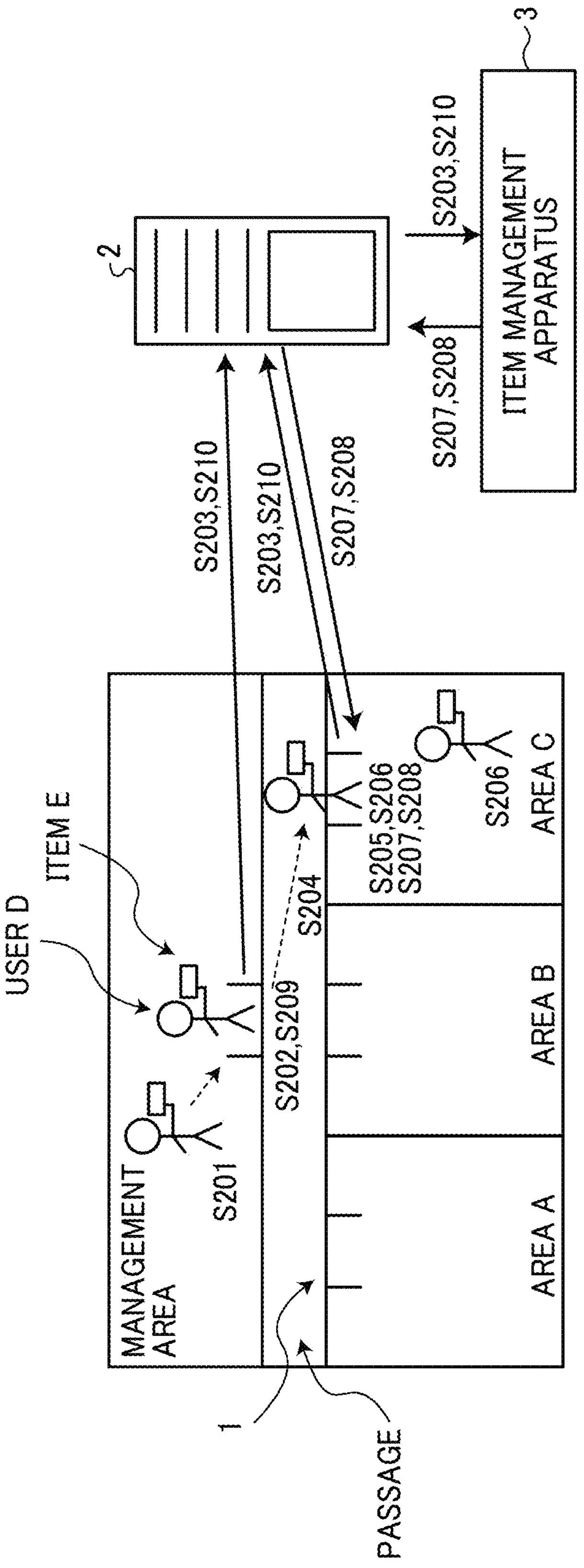
FIG. 2 is a diagram illustrating an example of usage of the tracking system according to the first embodiment of the present disclosure.

FIG. 2 is a diagram illustrating an example of usage of the tracking system according to the present embodiment. FIG. 3 is a diagram illustrating management information of the tracking system according to the present embodiment. When a user D takes out an item E from the management area and moves toward the gate 1 of the management area (Step S201), the gate 1 (reading function 1-1) detects an information holding medium of the user D and an information holding medium of the item E. The gate 1 (transmission function 1-2) transmits, to the server 2, user identification information and item identification information read from corresponding one of the information holding media, in addition to the gate identification information (Step S202). As illustrated in FIG. 3, the item management apparatus 3 (automatic lending/returning function 3-2) sets a date and time when the item passes through the gate 1 to a lending date and time, and determines a return deadline (for example, seven days after the lending date and time) based on the lending date and time. A different lending period can be set for each item.

The server 2 (transmission/reception function 2-1) transmits the user identification information, the item identification information, and the gate identification information, which have been transmitted to the server 2, to the item management apparatus 3. As illustrated in FIG. 3, the item management apparatus 3 (accumulation function (3-1)) records the user identification information (for example, user name), the item identification information (for example, item name), and the gate identification information (for example, gate name), which have been received (Step S203).

Subsequently, when the user D goes to the gate 1 of an area C with the item E (Step S204), the item management apparatus 3 (second addition function 3-4) updates the entry/exit status associated with the identification information of the user D and the item E from exit from the management area to entry to the area C (Step S205), as illustrated in FIG. 3. Subsequently, the user D uses the item E in the area C (Step S206). Then, when a user other than the user D pass through the gate 1 from the area C with the item E, the gate 1 (the relending prevention function 1-3) locks the door of the gate 1 (Step S207).

When the return deadline of the item E approaches, the gate 1 (the non-return notification and prevention function 1-4) issues a return notification when the user enters to or exits from the area C (Step S208). Further, the gate 1 (the non-return notification and prevention function 1-4) does not open the door of the gate 1 when the user does not exit from the area C with the item E on the day of the return deadline of the item E. The item management apparatus 3 (automatic lending/returning function 3-2) determines the completion of the return when the user D and the item E pass through the gate 1 of the management area by the return deadline (Step S209). When the user identification information of the user D and the item identification information of the item E at the time of entering the management area are the same at the time of lending date and time in Step S202, the gate 1 (automatic lending/returning function 3-2) records a time when the user D passes through the gate 1 as a return date and time in the item management apparatus via the server 2 (Step S210).

As described above, in the tracking system according to the present embodiment, the gate 1 provided with the information reader 517 is placed at the entrance (entrance/exit) of the area, the information holding medium attached to the item is read when the item passes through the gate, the position information of the item is accumulated in the item management apparatus 3, and the position information of the item can be tracked, accordingly. As a result, loss of a lent item due to, for example, the relending of the item to a different user other than the user to whom the item has been lent or the failure to return the lent item can be prevented.

Second Embodiment

Figure 4:
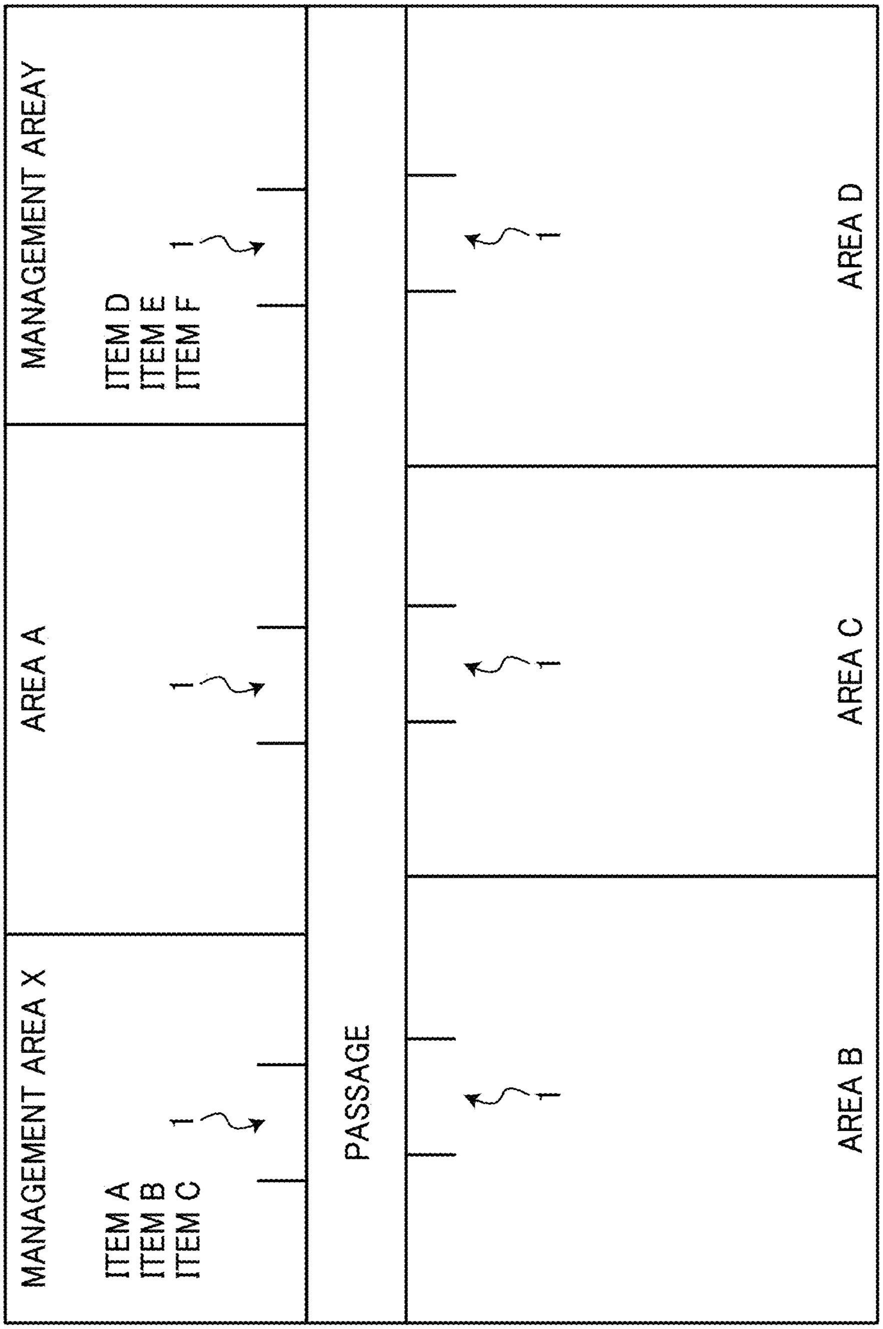
FIG. 4 is a diagram illustrating an example of arrangement of areas in a case that there are two management areas according to some embodiments of the present disclosure.

In the first embodiment, the case where the number of management areas is one has been described, but the number of management areas for storing items may be more than one. FIG. 4 is a diagram illustrating an example of arrangement of areas in a case that there are two management areas. In this example, items A, B, and C are determined to be stored or kept in a management area X and items D, E, and F are determined to be stored or kept in a management area Y. In the present embodiment (second embodiment), in a case where a management area is assigned for each item for storage as described above, for example, after a user takes out the item E from the management area Y and uses the item E, the item E is to be returned to the management area Y which is a storage place of the item E. When the user is about to return the item E to the management area X by mistake, the gate 1 of the management area X is locked, and this prevents the item E from being taken or brought into the management area X.

Figure 5A:
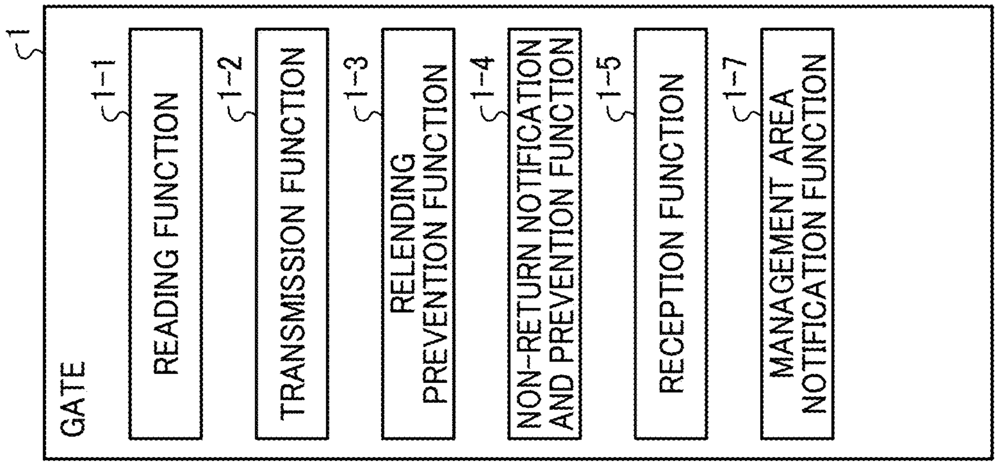
FIGS. 5A, 5B, and 5C are diagrams illustrating a functional configuration of a gate, a functional configuration of a server, and a functional configuration of an item management apparatus, respectively, according to a second embodiment of the present disclosure.
Figure 5B:
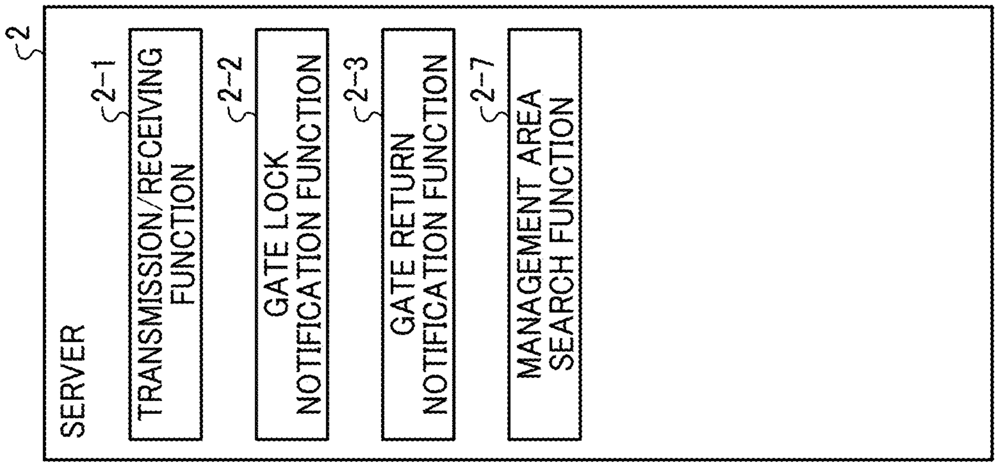
Figure 5C:
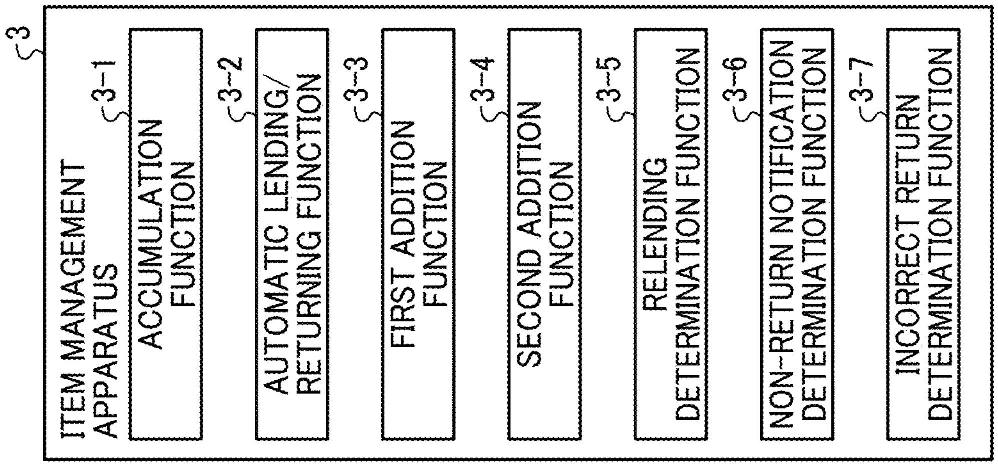

FIGS. 5A, 5B, and 5C are diagrams illustrating a functional configuration of a gate 1, a functional configuration of a server 2, and a functional configuration of an item management apparatus 3, respectively, according to the present embodiment (second embodiment). The difference from the first embodiment is that the gate 1 includes a management area notification function 1-7, the server 2 includes a management area search function 2-7, and the item management apparatus 3 includes an incorrect return determination function 3-7. The above-mentioned functions are described below. The other functions and the hardware configurations are the same as those of the first embodiment, and thus the description thereof is omitted.

When a user enters the gate 1 of a management area with an item, the item management apparatus 3 receives user identification information of the user, item identification information of the item, and gate identification information of the gate 1 via the server 2. Then, the incorrect return determination function 3-7 of the item management apparatus 3 refers to management area information, which is described later, and checks a management area that is the storage place of the item corresponding to the received item identification information and checks the received gate identification information for comparison. This check is to determine whether the user is about to incorrectly return the item, which has been taken out by the user, to a management area other than a predetermined (correct) storage place. When the received gate identification information does not correspond to, or is inconsistent with, the management area that is a storage place of the item, it is determined that the user is about to incorrectly return the item. Then, as a result of the check, when the received gate identification information does not correspond to, or is inconsistent with, the management area that is the storage place of the item, the incorrect return determination function 3-7 transmits a gate lock instruction to the gate lock notification function 2-2 of the server 2. The gate lock notification function 2-2 of the server 2 notifies the gate 1 of the gate lock instruction, and the gate 1 of the management area locks the door of the gate 1 to prevent the item from being incorrectly returned.

The management area search function 2-7 of the server 2 searches for management area information, acquires the management area information indicating the storage place of the item, and transmits the management area information to the management area notification function 1-7 of the gate 1. The management area notification function 1-7 displays the received information of the management area of the item on, for example, the display 506, and notifies the user of the management area where the item is to be returned. The information on the management area may be notified to the user by, for example, voice.

Some items may have determined management areas for storage, and the other items may not have determined areas for storage. FIG. 6A is a diagram illustrating an example of the management area information indicating a storage place for each item. In FIG. 6A, "1" indicates availability of storing an item, and "0" indicates unavailability of storing an item. In this example, it is indicated that the items A and B can be stored in the management area X but are not accepted to be stored in the management area Y, and that the items D and E can be stored in the management area Y but are not accepted to be stored in the management area X. Further, it is indicated that both of the management areas X and Y are available for storing each of the items C and F. Accordingly, for example, when the item C is returned, the incorrect return determination function 3-7 does not transmit a gate lock instruction when the user passes through the gate 1 of the management area X or the management area Y.

FIG. 6B is a diagram illustrating another example of the management area information indicating a storage place for each item. In the column of "MANAGEMENT AREA," a name (or gate identification information) of a management area for each item is recorded. In FIG. 6B, as indicated in FIG. 6A, the storage place of each of the items A and B is the management area X, the storage place of each of the items D and E is the management area Y, and both of the management areas X and Y are available for storing each of the items C and F.

The number of management areas may be three or more. For example, when there are three management areas X, Y, and Z, the management area information of FIG. 6A includes a column of "MANAGEMENT AREA Z" in addition to the columns of "MANAGEMENT AREA X" and "MANAGEMENT AREA Y," and whether each item can be stored in the management area Z is additionally represented by "1" or "0". The management area information of FIG. 6B that records a name of a management area (X, Y, Z) for each item in the column of "MANAGEMENT AREA" can be used for determination performed by the incorrect return determination function 3-7 of the item management apparatus 3.

As described above, according to the present embodiment, even when there are multiple management areas, and when a storage place is determined for each item, it is possible to prevent an item from being incorrectly returned. This allows a user to return an item to an appropriate management area.

Third Embodiment

The area in which an item can be used may be limited. For example, an item that is permitted to be used only in an area where a ventilation function is provided, or an item that is permitted to be used only in a specific temperature environment or humidity environment, is limited in an area (permission area) in which the item can be taken or brought after being lent to a user. A tracking system according to the present embodiment (third embodiment) can prevent a user from entering erroneously an area where taking or bringing a specific item by the user is restricted.

Figure 7C:
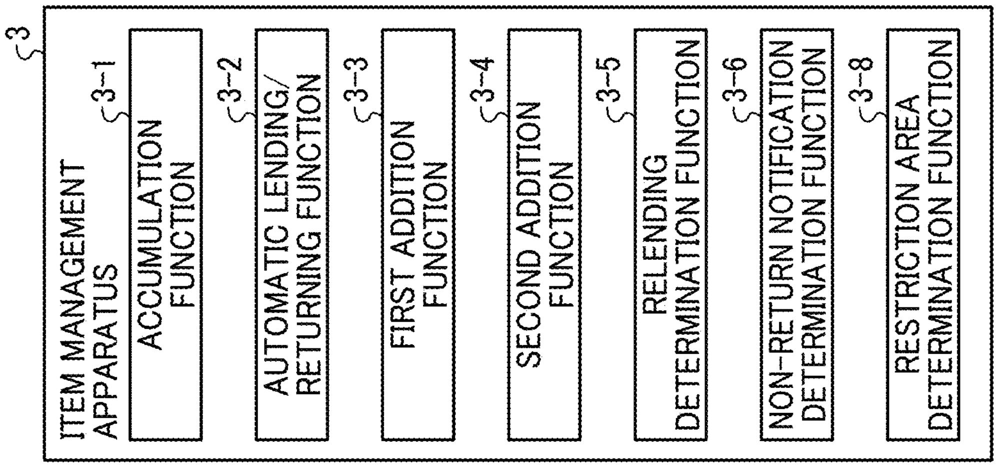
FIGS. 7A, 7B, and 7C are diagrams illustrating a functional configuration of a gate, a functional configuration of a server, and a functional configuration of an item management apparatus, respectively, according to a third embodiment of the present disclosure.
Figure 7B:
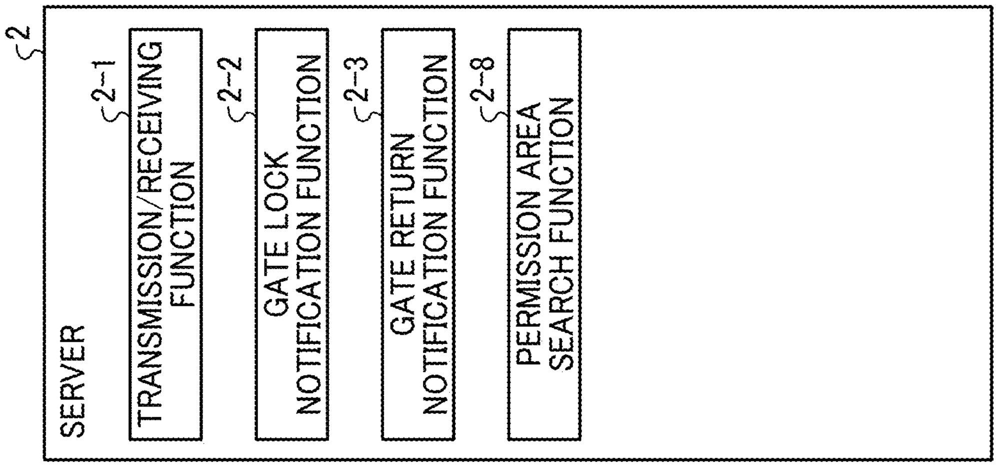
Figure 7A:
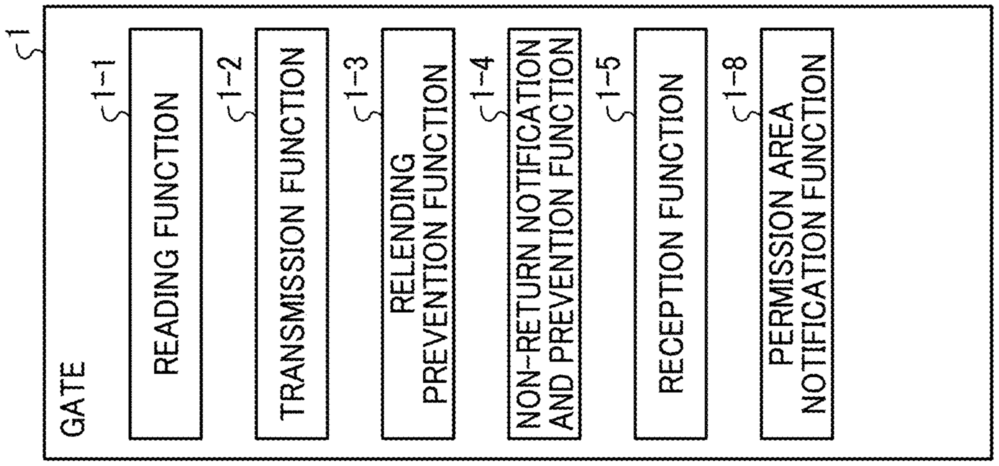

FIGS. 7A, 7B, and 7C are diagrams illustrating a functional configuration of the gate 1, a functional configuration of the server 2, and a functional configuration of the item management apparatus 3, respectively, according to the present embodiment (third embodiment). The difference from the first embodiment is that the gate 1 includes a permission area notification function 1-8, the server 2 includes a permission area search function 2-8, and the item management apparatus 3 includes a restriction area determination function 3-8. The above-mentioned functions are described below. The other functions and the hardware configurations are the same as those of the first embodiment, and thus the description thereof is omitted.

When a user is about to enter the gate 1 of an area with an item, the item management apparatus 3 receives user identification information of the user, item identification information of the item, and gate identification information of the gate 1 via the server 2. Then, the restriction area determination function 3-8 of the item management apparatus 3 refers to permission area information, which is described later, and checks a permission area that is an area to which the item identified by the received item identification information can be taken or brought and checks the received gate identification information for comparison. This check is to determine whether the user is about to pass through a gate of an area where taking the item is restricted. When the received gate identification information does not correspond to, or is inconsistent with, the permission area for the item, it is determined that the item is about to pass through the gate of the area where taking the item is restricted. Then, as a result of the check, when the received gate identification information does not correspond to, or is inconsistent with, the permission area for the item, the restriction area determination function 3-8 transmits a gate lock instruction to the gate lock notification function 2-2 of the server 2. The gate lock notification function 2-2 of the server 2 notifies the gate 1 of the gate lock instruction, and the gate 1 of the management area locks the door of the gate 1 to prevent the user from entering erroneously.

The permission area search function 2-8 of the server 2 searches for permission area information to acquire information on the permission area for the item, and transmits the information to the permission area notification function 1-8 of the gate 1. The permission area notification function 1-8 displays the received information on the permission area on the display 506, and notifies the user of an area to which the item can be taken. The information on the permission area may be notified to the user by, for example, voice.

Figures 8A, 8B, 9:
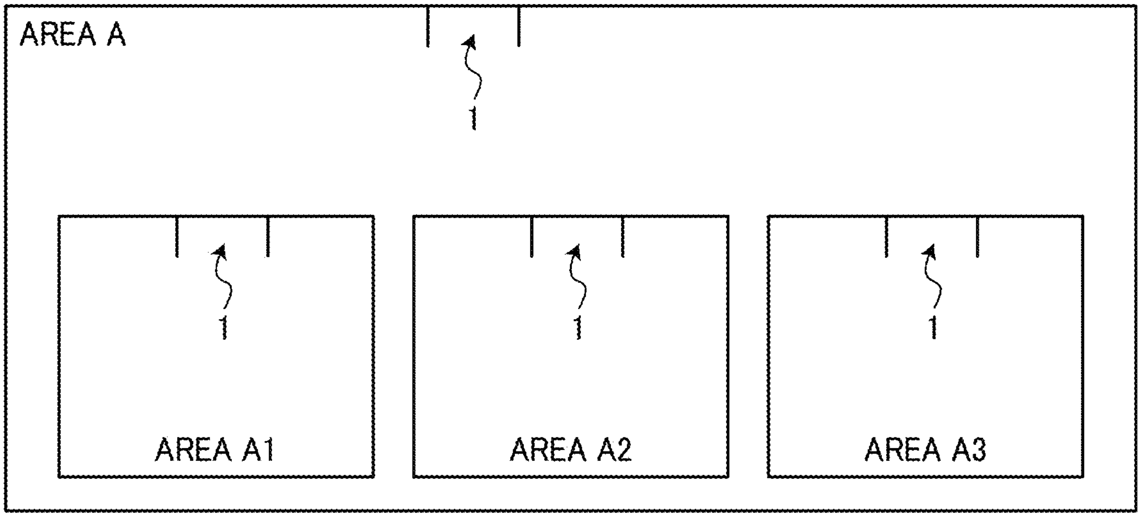
FIGS. 8A and 8B are diagrams each illustrating an example of permission area information in which a permission area for each item is recorded, according to some embodiments of the present disclosure.
FIG. 9 is a diagram illustrating an example of arrangement of multiple areas in an area, according to some embodiments of the present disclosure.

FIG. 8A is a diagram illustrating an example of the permission area information in which a permission area for each item is recorded. In FIG. 8A, "1" indicates that the use of an item is permitted, and "0" indicates that the use of an item is not permitted. In this example, the item A is permitted to be taken or brought into the area C, and the item C is permitted to be taken or brought into the area A and the area B. There is no limitation of the permission area for the item B. FIG. 8B is a diagram illustrating another example of the permission area information. Area information corresponding to a permission area is recorded in the column of "PERMISSION AREA," and similarly to FIG. 8A, it is indicated that the item A is permitted to be taken or brought into the area C, the item C is permitted to be taken or brought into the area A and the area B, and there is no limitation of the permission area for the item B.

As described above, according to the present embodiment, even when the permission area is limited for an item, it is possible to prevent the user from erroneously entering an area where taking the item is restricted, and to notify the user of an area where the user is permitted to use the item. This allows the user to use the item in an appropriate area.

Fourth Embodiment

In the above description, the areas are arranged independently of each other, but multiple areas (sub-areas) may be arranged in one area. In a case that each of the areas arranged independently of each other is vast, even if an area to which an item is taken or brought can be identified, detailed position information of the item is unknown. By arranging multiple areas (sub-areas) in one area, detailed position information of the item can be grasped.

FIG. 9 is a diagram illustrating an example of arrangement of multiple areas (sub-areas) in an area. In this example, three areas (sub-areas) A1, A2, and A3 are arranged in an area A, and the gates 1 is placed at an entrance (entrance/exit) of the area A and at each entrance (entrance/exit) of corresponding one of the areas (sub-areas) A1, A2, and A3. The functional configuration and the hardware configuration of the gate 1, the server 2, and the item management apparatus 3 of the present embodiment (fourth embodiment) are the same as those of the first embodiment, and thus the description thereof is omitted.

FIG. 10 is a diagram illustrating an example of management information of the tracking system according to the present embodiment. For example, at the time of a date and time 4-1, a user C enters the area A with an item B, but does not enter any of the areas (sub-areas) A1, A2, and A3 arranged in the area A, and this indicates that the item B is in a place other than the areas (sub-areas) A1, A2, and A3 in the area A. At the time of a date and time 4-2, the user C enters the area (sub-area) A1 with the item B, and this indicates that the item B is in the area (sub-area) A1 in the area A. Further, at the time of a date and time of 4-3, the user C has left the area (sub-area) A1 and entered the area (sub-area) A3 with the item B, and this indicates that the item B is in the area (sub-area) A3 in the area A.

As described above, according to the present embodiment, since multiple areas are arranged in an area, even when one area is large, it is possible to grasp detailed position information of an item.

Fifth Embodiment

When many areas are arranged, it may be difficult for a user to grasp the arrangement of areas. In the present embodiment, a function for easily grasping the arrangement of areas and a place of an item when a user checks management information is added to the tracking system.

Figure 11:
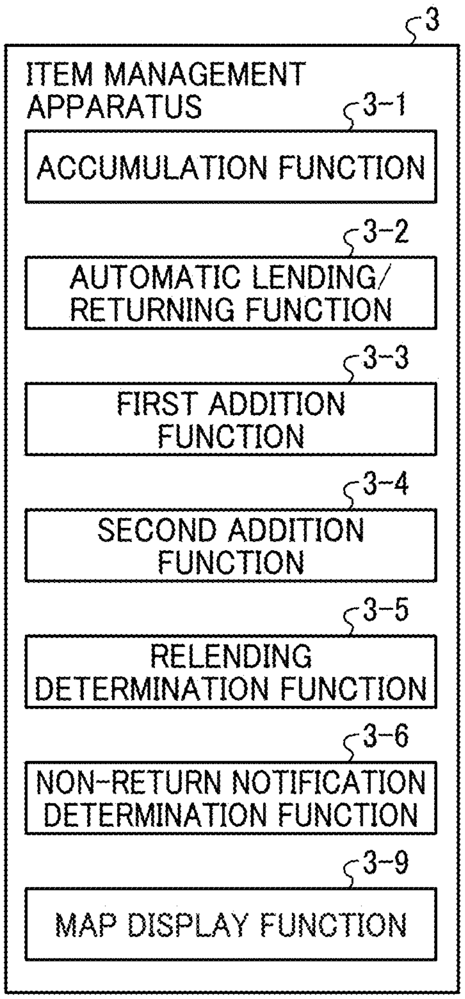
FIG. 11 is a diagram illustrating an example of a functional configuration of an item management apparatus according to a fifth embodiment of the present disclosure.

FIG. 11 is a diagram illustrating an example of a functional configuration of an item management apparatus 3 according to the present embodiment (fifth embodiment). The difference from the first embodiment is that the item management apparatus 3 includes a map display function 3-9. This function is described below. The other functions and the hardware configurations are the same as those of the first embodiment, and thus the description thereof is omitted.

FIGS. 12A and 12B are diagrams each illustrating an example of usage of the tracking system according to the present embodiment. The map display function 3-9 of the item management apparatus 3 displays, on the display 5, management information of the tracking system in response to an instruction according to a user operation performed via the keyboard 511 of the pointing device 512 (Step S301). In FIG. 12A, the management information of the item B and the item D is displayed on the display 5. In the present embodiment, the user who instructs the display of the management information may be any of the user C who has taken the item B, the user A who has taken the item D, and another user.

Subsequently, the user selects the management information of the item D using the pointing device 512 (Step S302). At this time, the map display function 3-9 may indicate which management information is selected by, for example, blinking the selected management information, or reducing the display density of the management information other than the selected management information.

The map display function 3-9 displays an area arrangement diagram (area layout diagram, area map) on the display 5 as illustrated in FIG. 12B, and blinks a region corresponding to an area C in which the item D indicated by the selected management information is present (Step S303). To display the area layout diagram, the item management apparatus 3 stores link information that associates the gate identification information of each area with a position of each area displayed on the area map. When the management information is selected, the map display function 3-9 acquires an area closest to a place of the item managed by the management information, acquires a position of the area in the area map associated with the gate identification information of the area, and blinks a region where the area is located. As described above, the map display function 3-9 displays the area arrangement diagram on which a position of the area to which the item is currently taken is indicated. Accordingly, the user can grasp the position of the area C where the item D indicated by the selected management information is currently used on the area map. The link information may be stored in, for example, the HD 504, the DVD-RW 513, or the recording media 515 in the item management apparatus 3. The map display function 3-9 may display the position of the area in the area arrangement diagram by changing the color of the region where the area is located instead of blinking the region.

In Step S302, the user can select an area name described in the column of the gate name instead of selecting the management information. When the user selects an area name, the map display function 3-9 displays a position of an area corresponding to the selected area name on the area map. The user can designate an item name to be searched for with respect to the item management apparatus 3 by using the keyboard 511 or the pointing device 512. In this case, the map display function 3-9 acquires the designated item name from the management information, identifies a position of an area in the area map by acquiring the position of the area associated with the designated item form the management information, and displays the area arrangement diagram on which the position of the area is indicated.

As described above, according to the present embodiment, even when the user does not grasp all the arrangement of areas, the user can easily grasp a position of an area to which the item is taken or brought by displaying the area arrangement diagram on which the position of the area is indicated, and the user can grasp where the item is.

Sixth Embodiment

For an item that is frequently used or for an item that is in a small number, there is a case that a user may desire to make a reservation to use the item next when the item is lent to another user. In the present embodiment (sixth embodiment), a function for notifying a user of a reservation request or a reservation being under request for an item is added to the tracking system.

Figure 13A:
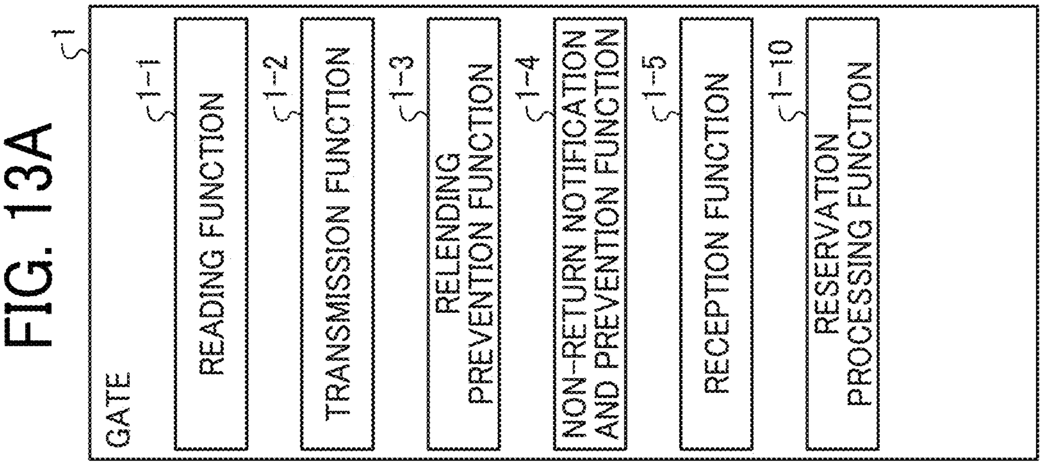
FIGS. 13A, 13B, and 13C are diagrams illustrating a functional configuration of a gate, a functional configuration of a server, and a functional configuration of an item management apparatus, respectively, according to a sixth embodiment of the present disclosure.
Figure 13B:
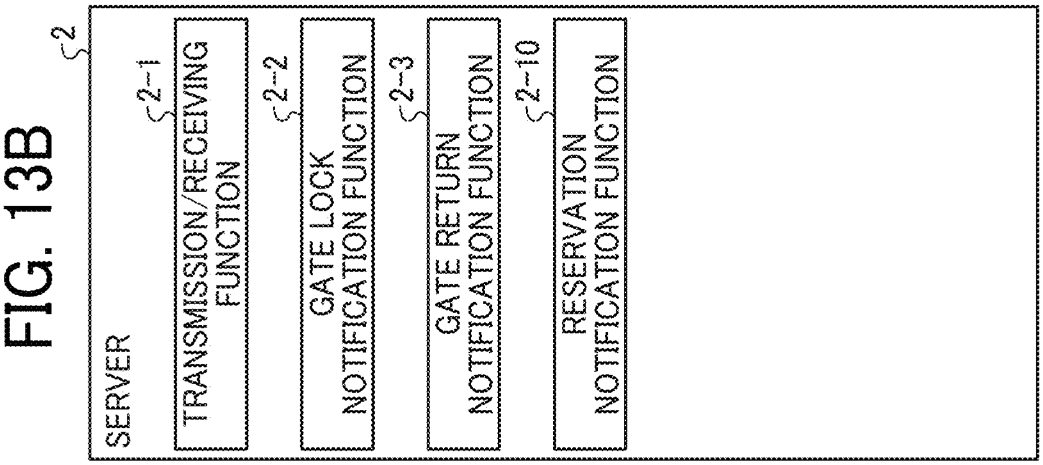
Figure 13C:
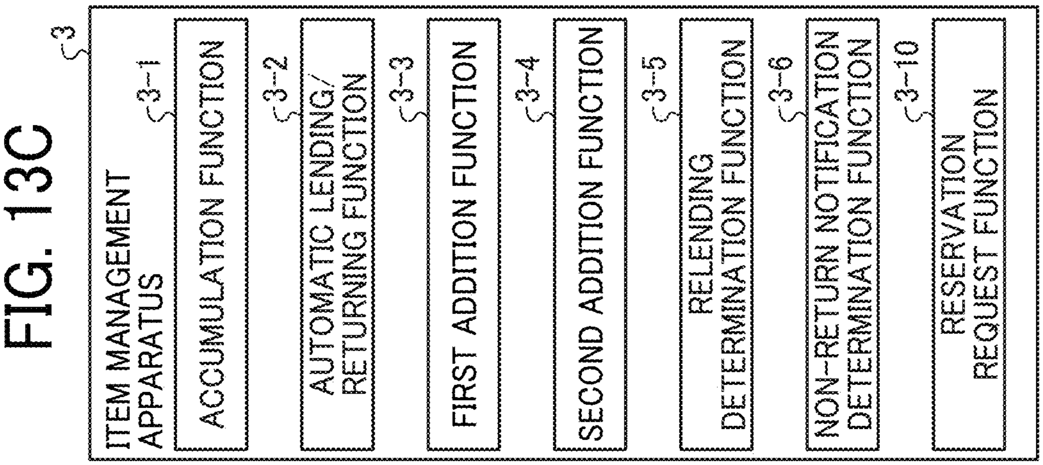

FIGS. 13A, 13B, and 13C are diagrams illustrating an example of a functional configuration of a gate 1, a functional configuration of a server 2, and a functional configuration of an item management apparatus 3, respectively, according to the present embodiment. The difference from the first embodiment is that the gate 1 includes a reservation processing function 1-10, the server 2 includes a reservation notification function 2-10, and the item management apparatus 3 includes a reservation request function 3-10. The above-mentioned functions are described below. The other functions and the hardware configurations are the same as those of the first embodiment, and thus the description thereof is omitted.

FIG. 14 is a diagram illustrating an example of management information of the tracking system according to the present embodiment. In this example, at the time of a date and time 6-1, an item B is being used by a user C in an area A, but a user D can request for reservation of the item B by using the keyboard 511 or the pointing device 512 of the item management apparatus 3. When the reservation request function 3-10 of the item management apparatus 3 receives a reservation request, the reservation request function 3-10 adds an item name of the item B and a user name of the user D to the management information together with information indicating "UNDER REQUEST" in the field of reservation status. Further, the reservation request function 3-10 transmits information (reservation request information) indicating that a reservation request has been made for the item B to the server 2.

When the reservation notification function 2-10 of the server 2 receives the reservation request information from the reservation request function 3-10, the reservation notification function 2-10 transmits the reservation request information to the gate 1 of each area and transmits an electronic mail (e-mail) indicating details of the reservation request to the user C. The e-mail includes information on an item name (item B) of an item to be reserved and a reservation requester (user D), and also includes, for example, a message requesting that the item B be returned promptly if the use of the item B is finished before the return deadline.

When detecting that the user C passes without the item B, the reservation processing function 1-10 of the gate 1 in each area notifies that the reservation request has been made by using the return notification unit.

In this example, the user C returns the item B at the time of a date and time 6-2 in response to the e-mail indicating the details of the reservation request or the notification by the return notification unit. When the return of the item B is completed, the reservation request function 3-10 adds the item name of the item B and the user name of the user D to the management information together with the information indicating "RESERVED" in the field of the reservation status at the time of a date and time 6-3 (the time of the return date and time). The reservation request function 3-10 transmits information (reservation information) indicating that the user D is reserving the item B to the server 2.

When the reservation information is received from the reservation request function 3-10, the reservation notification function 2-10 of the server 2 transmits the reservation information to the gate 1 of each area and transmits, to the user D, an e-mail indicating the details of the reservation. The e-mail includes information on an item name (item B) of an item to be reserved and a reservation requester (user D), and also includes, for example, a message requesting to start using the item B by a predetermined date and time.

As described above, according to the present embodiment, even when an item is being lent to a user, another user can request a reservation for the item and prompt the user to return the item promptly.

Further, after the item is returned, it is possible to prompt the other user who has requested the reservation to start using the item, and it is possible to promote smooth operation of the item.

The functions of the embodiments described above are not limited to the respective embodiments.

For example, the functions described in the second embodiment can be applied to each of the third to sixth embodiments. The functions described in each of the third to sixth embodiments can be similarly applied to each of the other embodiments. Each of the functions of the above-described embodiments may be implemented by one or more processing circuits or circuitry.

The functionality of the elements disclosed herein may be implemented using circuitry or processing circuitry which includes general-purpose processors, special purpose processors, integrated circuits, application-specific integrated circuits (ASICs), digital signal processors (DSPs), field-programmable gate arrays (FPGAs), conventional circuitry and/or combinations thereof which are configured or programmed, using one or more programs stored in one or more memories, to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality.

The program executed by the processing circuitry according to the present embodiment may be stored in a computer-readable recording medium, such as a compact disc read-only memory (CD-ROM), a flexible disk (FD), a compact disc recordable (CD-R), and a digital versatile disk (DVD), in an installable or executable file format, to be provided as a computer program product.

Alternatively, the computer programs executed by the processing circuitry according to the present embodiment may be stored in a computer connected to a network such as the Internet and downloaded through the network. Alternatively, any computer program executed by the processing circuitry according to the present embodiment described above may be provided or distributed via a network such as the Internet.

The program executed by the processing circuitry can cause a computer to function as each unit of the processing circuitry. The computer can execute the program by reading the program from the computer-readable recording medium by the CPU 501 onto a main storage unit.

The processing circuitry may be implemented as a virtual machine that operates on a cloud system.

Although the above-described embodiments of the disclosure have been described and illustrated, such description is not intended that the disclosure be limited to the illustrated embodiments. Numerous additional modifications and variations are possible in light of the above teachings. It is therefore to be understood that within the scope of the appended claims, the present disclosure may be practiced otherwise than as specifically described herein. For example, elements and/or features of different illustrative embodiments may be combined with each other and/or substituted for each other within the scope of this disclosure and appended claims.

In addition, the above-described embodiments are included in the scope and the gist of the disclosure, and are included in the invention described in the claims and the equivalent scopes thereof.

Aspects of the present disclosure are, for example, as follows.

Aspect 1

A tracking system according to Aspect 1 can manage lending of an item kept in a management area to outside of the management area and track a place to which the item is taken after being lent. The tracking system includes a gate, server, and an item management apparatus. The gate is placed at an entrance of each of the management area and an area included in the place to which the item is taken. The gate includes an information reader. The entrance also serves as an exit. The tracking system accumulates in the item management apparatus, via the sever, item identification information identifying the item and read from an information holding medium of the item, user identification information identifying a user and read from another information holding medium of the user, and gate identification information identifying the gate.

Aspect 2

In the tracking system according to Aspect 1, the gate includes a reading function for reading the item identification information and the user identification information from the information holding medium of the item and the information holding medium of the user using the information reader. The gate further includes a transmission function for transmitting the item identification information, the user identification information, and the gate identification information to the server. The gate further includes a relending prevention function for locking a door of the gate to prevent relending of the item, in a case that different user identification information identifies a different user other than the user to whom the item has been lent is read with the item identification information. The gate further includes a non-return notification and prevention function for notifying the user of non-return of the item, namely making a reminder for returning the item to the user, in a case that the user passes through the gate with the item at a date and time close to a return deadline determined by the item management apparatus.

Aspect 3

In the tracking system according to Aspect 1 or Aspect 2, the server includes a transmission/reception function for receiving the user identification information, the item identification information, and the gate identification information. The transmission/reception function further transmits the user identification information, the item identification information, and the gate identification information. The server further includes a gate lock notification function for notify the gate of a gate lock instruction to lock the door of the gate. The gate lock instruction is transmitted from the item management apparatus. The server further includes a gate return notification function for notifying the gate of a non-return notification instruction transmitted from the item management apparatus. The gate further includes a reception function for receiving the gate lock instruction and the non-return notification instruction. The relending prevention function locks the door of the gate in response to the gate lock instruction received by the reception function. The non-return notification and prevention function notifies a return notification unit of the non-return notification instruction received by the reception function to make the reminder for the user to return the item and locks the door of the gate in response to the non-return notification instruction received by the reception function.

Aspect 4

In the tracking system according to any one of Aspect 1 to Aspect 3, the item management apparatus includes an accumulation function for accumulating the item identification information, the user identification information, and the gate identification information that are received from the server. The item management apparatus further includes an automatic lending/returning function for associating the user identification information and the item identification information to be accumulated to perform lending processing for lending the item to the user, in a case that the user exits the management area with the item. The automatic lending/returning function further completes returning processing for returning the item in response to accumulation of the user identification information and the item identification information that have been associated with each other at a time of the lending processing. The accumulation is performed in response to entry of the user identification information and the item identification information to the management area. The item management apparatus further includes a first addition function for adding a user name of the user and an item name of the item to management information that includes the user identification information and the item identification information. The item management apparatus further includes a second addition function for determining entry to the area or exit from the area to obtain a determination result and adding the determination result to the management information. The item management apparatus further includes a relending determination function for determining, each time the user passes through the gate, whether the user identification information is one that has been associated with the item identification information by the automatic lending/returning function based on the user identification information and the item identification information to determine whether the item is subjected to relending for the different user other than the user. The item management apparatus further includes a non-return notification determination function for determining, each time the user passes through the gate, whether the item has been forgotten to be returned. The non-return notification determination function determines that the item has been forgotten to be returned and transmits a non-return notification instruction to the server, in a case that a difference between a current date and time and the return deadline is within a predetermined number of days.

Aspect 5

In the tracking system according to any one of Aspect 2 to Aspect 4, the reading function further detects presence of the information holding medium held by the user and the information holding medium attached to the item to read the user identification information and the item identification information from the information holding media.

Aspect 6

In the tracking system according to any one of Aspect 2 to Aspect 5, the transmission function transmits, to the server, the user identification information and the item identification information that are read by the reading function. The transmission function further transmits the gate identification information assigned to each gate of the management area and the area.

Aspect 7

In the tracking system according to any one of Aspect 2 to Aspect 6, the relending prevention function locks the door of the gate in a case that the different user identification information identifying the different user other than the user to whom the item has been lent is read, to prevent the different user from passing through the gate.

Aspect 8

In the tracking system according to any one of Aspect 2 to Aspect 7, the non-return notification and prevention function makes the reminder for the user to return the item to prompt the user to return the item, in a case that the user passes through the gate with the item having been lent to the user at a time when the return deadline determined by the item management apparatus is approaching. The non-return notification and prevention function further notifies the user of the non-return notification instruction by the return notification unit, namely makes the reminder for the user to return the item, and locks the door of the gate, in a case that the user is about to exit the area where the item has been used without the item on a day of the return deadline of the item. The non-return notification and prevention function further keeps the door of the gate unlocked to allow the user to pass through the gate, in a case that the user exits the area with the item to be returned.

Aspect 9

In the tracking system according to Aspect 3, the transmission/reception function receives the user identification information, the item identification information, and the gate identification information from the gate, and transmits the user identification information, the item identification information, and the gate identification information to the item management apparatus.

Aspect 10

In the tracking system according to Aspect 3, the gate lock notification function notifies the gate of the gate lock instruction transmitted from the item management apparatus in a case that the item is determined to be subjected to relending for the different user.

Aspect 11

In the tracking system according to Aspect 3, the non-return notification and prevention function transmits the non-return notification instruction transmitted from the item management apparatus to the return notification unit in a case that the item is determined to be forgotten to be returned.

Aspect 12

In the tracking system according to Aspect 4, the accumulation unit accumulates the user identification information and the item identification information read by the reading function as the management information.

Aspect 13

In the tracking system according to Aspect 4, the automatic lending/returning function associates the user identification information and the item identification information accumulated by the accumulation unit at the time when the user exits the management area with the item with each other to complete the lending processing. The automatic lending/returning function additionally records a lending date and time and the return deadline of the item in the management information. The lending date and time is a date and time when the user passes through the gate. The return deadline is a date and time obtained by adding a lendable period that is set to the item to the lending date and time. The automatic lending/returning function completes the returning processing for returning the item in response to entry of the user identification information and the item identification information to the management area. The user identification information and the item identification information have been associated with each other at the time of the lending processing. At the time of completing the returning processing, the automatic lending/returning function additionally records a return date and time in the management information. The return date and time is a date and time of the entry of the user identification information and the item identification information to the management area.

Aspect 14

In the tracking system according to Aspect 4, the first addition function prepares a table that is a list including a user name corresponding to the user identification information and an item names corresponding to the item identification information in the item management apparatus. When the user identification information and the item identification information are received from the server, the first addition function searches the table for the use name and the item name corresponding to the user identification information and the item identification information, respectively, and adds the user name and the item name to the management information.

Aspect 15

In the tracking system according to Aspect 4, the relending determination function determines, each time the user passes through the gate, whether the user identification information is one that is the same as the user identification information recorded at the time of lending processing performed by the automatic lending/returning function based on the user identification information and the item identification information. In a case that the different user identification information that is different from the user identification information recorded at the time of the lending processing performed by the automatic lending/returning function is transmitted from the gate, the relending determination function determines that the item is subjected to relending for the different user, and transmits the gate lock instruction to lock the gate to the server to prevent the item from being taken out from the area.

Aspect 16

In the tracking system according to Aspect 13, the non-return notification determination function determines, each time the user passes through the gate, whether the item has been forgotten to be returned. In a case that a difference between a current date and time and the return deadline is within a predetermined number of days, the non-return notification determination function determines that the item has been forgotten to be returned and transmits the non-return notification instruction to the server. The non-return notification determination function keeps the door from opening and prevents the user from exiting the area when the gate has not detected the information holding medium of the item to be returned simultaneously with the information holding medium of the user when the user exits the area where the item was used on the day of the return deadline.

Aspect 17

In the tracking system according to any one of Aspect 3, Aspect 9, Aspect 10, and Aspect 11, the item management apparatus further includes an incorrect return determination function. The item is kept or stored in one of a plurality of management areas. In a case that a storage place of the item is determined to be at least one of the plurality of management areas and the gate identification information of one of the plurality of management areas received from the server together with the item identification information of the item does not correspond to, or is inconsistent with, the at least one of the plurality of management areas, the incorrect return determination function transmits the gate lock instruction to the server. The gate lock notification function notifies the gate of the gate lock instruction transmitted from the item management apparatus.

Aspect 18

In the tracking system according to any one of Aspect 3, Aspect 9, Aspect 10, Aspect 11, and Aspect 17, the item management apparatus further includes a restriction area determination function. In a case that the item is restricted from being taken into at least one of a plurality of areas including the area, the restriction area determination function transmits, to the server, the gate lock instruction when the gate identification information of one of the plurality of areas received from the server together with the item identification information of the item is consistent with the at least one of the plurality of areas. The gate lock notification function notifies the server of the gate lock instruction transmitted from the item management apparatus.

Aspect 19

The tracking system according to any one of Aspect 1 to Aspect 18, the area includes a plurality of areas, and at least one of the plurality of areas includes one or more sub-areas inside the at least one of the plurality of areas, and the gate is placed at the entrance (entrance/exit) of each of the plurality of areas and each of one or more entrances corresponding to the one or more areas.

Aspect 20

The tracking system according to any one of Aspect 1 to Aspect 19, the item management apparatus further includes a map display function. The map display function displays an area arrangement diagram indicating a position of the area to which the item is taken.

Aspect 21

The tracking system according to any one of Aspect 4, Aspect 12, Aspect 13, Aspect 14, Aspect 15, and Aspect 16, the item management apparatus further includes a reservation request function. The reservation request function receives a reservation request from another user for the item taken by the user, and the reservation request function adds an item name of the item for which the reservation request is received and a user name of the other user to the management information.

In the related art, tracking an item such as a document fails unless the item is present at a position where a reader of a non-contact IC can detect the item.

According to one or more aspects of the present disclosure, the loss of a lent item due to, for example, the relending of the lent item to a different user other than a user currently borrowing the lent item or the failure to return the lent item can be prevented.

Any one of the above-described operations may be performed in various other ways, for example, in an order different from the one described above.

The invention claimed is:

1. A tracking system, comprising:

a gate including an information reader and gate circuitry, the gate being at least two gates including one gate placed at an entrance of a management area and the other gate placed at an entrance of an area, the management area being a place to keep an item to be lent, the area being included in another place to which the item is taken after being lent;

a server; and an item management apparatus, the gate circuitry being configured to request accumulating, in the item management apparatus via the server, item identification information identifying the item and read from an information holding medium related to the item, user identification information identifying a user and read from another information holding medium related to the user, and gate identification information identifying the gate, wherein:

the gate circuitry is configured to:

read, via the information reader, the item identification information and the user identification information from the information holding medium of the item and said another information holding medium of the user; and transmit, to the server, the item identification information, the user identification information, and the gate identification information, wherein, in a case that different user identification information identifying a different user other than the user to whom the item has been lent is read with the item identification information, the gate circuitry is further configured to lock a door of the gate, and in a case that the user passes through the gate with the item at a date and time having a difference from a return deadline of the item determined by the item management apparatus that is within a predetermined number of days, the gate circuitry is further configured to make a reminder for the user to return the item, wherein:

in a case that the user passes through the gate of the area with the item having been lent to the user at a time when the difference between the date and time and the return deadline of the item determined by the item management apparatus is within the predetermined number of days, the gate circuitry is configured to make the reminder for the user to return the item to prompt the user to return the item, in a case that the user is about to exit the area where the item has been used without the item on a day of the return deadline of the item, the gate circuitry is configured to make the reminder for the user to return the item and lock the door of the gate of the area, and in a case that the user exits the area with the item to be returned on the day of the deadline, the gate circuitry is configured to keep the door of the gate of the area unlocked to allow the user to pass through the gate of the area.

2. The tracking system of claim 1, wherein:

the server includes server circuitry configured to:

receive, from the gate, the user identification information, the item identification information, and the gate identification information; and transmit, to the item management apparatus, the user identification information, the item identification information, and the gate identification information.

3. The tracking system of claim 2, wherein;

the item management apparatus includes item management apparatus circuitry configured to:

accumulate, in a memory, the item identification information, the user identification information, and the gate identification information that are received from the server;

associate the user identification information and the item identification information to be accumulated to perform lending processing for lending the item to the user, in a case that the user exits the management area with the item;

complete returning processing for returning the item in response to accumulation of the user identification information and the item identification information that have been associated with each other at a time of the lending processing, the accumulation being performed in response to entry of the user and the item associated with each other at the time of the lending processing to the management area;

add a user name of the user and an item name of the item to management information that includes the user identification information and the item identification information;

determine one of entry to the area and exit from the area to obtain a determination result;

add the determination result to the management information;

determine, each time a user passes through the gate of the area with the item, whether the user identification information read by the gate of the area is one that has been associated with the item identification information at the time of the lending processing based on the user identification information and the item identification information, and determine that the item is subjected to relending for the different user other than the user in a case that the user identification information read by the gate of the area identifies the different user and is different from the user identification information associated with the item identification information at the time of the lending processing; and determine, each time the user passes through the gate of the area, whether the item has been forgotten to be returned, wherein, in a case that a difference between a current date and time and the return deadline is within a predetermined number of days, the item management apparatus circuitry is further configured to:

determine that the item has been forgotten to be returned; and transmit a non-return notification instruction to the server.

4. The tracking system of claim 3, wherein:

the item management apparatus circuitry is configured to accumulate the user identification information and the item identification information as the management information.

5. The tracking system of claim 3, wherein:

in a case that the user exits the management area with the item, the item management apparatus circuitry is configured to:

associate the user identification information and the item identification information to complete the lending processing; and additionally record a lending date and time and the return deadline of the item in the management information, the lending date and time being a date and time when the user passes through the gate, the return deadline being a date and time obtained by adding a lendable period that is set to the item to the lending date and time, and in a case that the user identification information and the item identification information that have been associated with each other at the time of the lending processing enter the management area, the item management apparatus circuitry is configured to:

complete the returning processing for returning the item; and additionally record a return date and time in the management information, the return date and time being a date and time when the user identification information and the item identification information that have been associated with each other at the time of the lending processing enter the management area.

6. The tracking system of claim 5, wherein;

the item management apparatus circuitry is further configured to determine, each time a user passes through the gate of the area with the item, whether the user identification information is one that is a same as the user identification information recorded at the time of the lending processing based on the user identification information and the item identification information, wherein, in a case that different user identification information identifying the different user that is different from the user identification information recorded at the time of the lending processing is transmitted from the gate of the area together with the item identification information, the item management apparatus circuitry is further configured to:

determine that the item is subjected to relending for the different user; and transmit, to the server, a gate lock instruction to lock the door of the gate of the area to prevent the item from being taken out from the area by the different user.

7. The tracking system of claim 3, wherein the item management apparatus circuitry is further configured to:

prepare a table that is a list including a user name corresponding to the user identification information and an item name corresponding to the item identification information in the item management apparatus;

search the table for the user name and the item name corresponding to the user identification information and the item identification information, respectively, in response to receiving the user identification information and the item identification information from the server; and add the user name and the item name to the management information.

8. The tracking system of claim 3, wherein the item management apparatus circuitry is further configured to:

receive a reservation request from another user for the item that has been lent to the user; and add an item name of the item for which the reservation request is received and a user name of said another user to the management information.

9. The tracking system of claim 8, wherein:

the server includes a reservation notification function to transmit an electronic mail indicating details of the reservation request to the user to whom the item has been lent.

10. The tracking system of claim 1, wherein:

the gate circuitry is further configured to determine presence of said another information holding medium held by the user and the information holding medium attached to the item to read the user identification information and the item identification information from the information holding medium and said another information holding medium, respectively.

11. The tracking system of claim 2, wherein;

the server circuitry is configured to:

receive, from the gate, the user identification information, the item identification information, and the gate identification information; and transmit, to the item management apparatus, the user identification information, the item identification information, and the gate identification information;

notify the gate of a gate lock instruction to lock the door of the gate, the gate lock instruction being transmitted from the item management apparatus; and notify the gate of a non-return notification instruction transmitted from the item management apparatus, and the gate circuitry is further configured to:

receive one of the gate lock instruction and the non-return notification instruction;

lock the door of the gate in response to receiving the gate lock instruction; and make the reminder for the user to return the item and lock the door of the gate in response to receiving the non-return notification instruction.

12. The tracking system of claim 11, wherein;

the server circuitry is configured to notify the gate of the gate lock instruction transmitted from the item management apparatus in a case that the item is determined to be subjected to relending for the different user.

13. The tracking system of claim 11, wherein;

the gate circuitry is configured to make the reminder for the user to return the item in response to the non-return notification instruction, the non-return notification instruction being transmitted from the item management apparatus in a case that the item is determined to be forgotten to be returned.

14. The tracking system of claim 11, wherein;

the management area includes a plurality of management areas, the item is assigned with a storage place that is determined to be at least one of the plurality of management areas, the item management apparatus includes item management apparatus circuitry, and in a case that the gate identification information of a gate of one of the plurality of management areas received from the server together with the item identification information of the item is inconsistent with the at least one of the plurality of management areas assigned as the storage place, the item management apparatus circuitry is configured to transmit, to the server, the gate lock instruction, and the server circuitry is configured to notify the gate of said one of the plurality of management areas of the gate lock instruction transmitted from the item management apparatus to lock a door of the gate of said one of the plurality of management areas to prevent the item from being incorrectly returned.

15. The tracking system of claim 11, wherein;

the area includes a plurality of areas, the item is restricted from being taken into at least one of the plurality of areas, the item management apparatus includes item management apparatus circuitry, and in a case that the gate identification information of one of the plurality of areas received from the server together with the item identification information of the item is consistent with the at least one of the plurality of areas, the item management apparatus circuitry is configured to transmit, to the server, the gate lock instruction, and the server circuitry is configured to notify the gate of the gate lock instruction transmitted from the item management apparatus.

16. The tracking system of claim 1, wherein:

the area includes one or more sub-areas inside the area, and the other gate is placed at each of the entrance of the area and one or more entrances corresponding to the one or more sub-areas.

17. The tracking system of claim 1, wherein;

the item management apparatus includes item management apparatus circuitry configured to display, on a display, an area arrangement diagram indicating the area to which the item is taken.

18. The tracking system of claim 17, wherein:

the item management apparatus circuitry is configured to blink a region corresponding to the area in which the item is present in the area arrangement diagram displayed on the display.

19. The tracking system of claim 1, wherein:

the gate further includes a display, and a management area notification function to display information of the management area of the item on the display to notify the user of the management area where the item is to be returned.

20. The tracking system of claim 1, wherein:

the gate further includes a display, and a permission area notification function to display information on a permission area on the display to notify the user of an area to which the item can be taken.

* * * * *